United States Patent
Lahtinen et al.

(10) Patent No.: US 7,811,357 B2
(45) Date of Patent: Oct. 12, 2010

(54) METHOD FOR RECOVERING RARE METALS IN ZINC LEACHING PROCESS

(75) Inventors: Marko Lahtinen, Espoo (FI); Mikko Ruonala, Kirkkonummi (FI); Kurt Svens, Espoo (FI); Stig-Göran Huldén, Turku (FI); Sigmund Fugleberg, Turku (FI)

(73) Assignee: Outotec Oyj, Espoo (FI)

( * ) Notice: Subject to any disclaimer, the term of this patent is extended or adjusted under 35 U.S.C. 154(b) by 153 days.

(21) Appl. No.: 12/096,004

(22) PCT Filed: Dec. 27, 2006

(86) PCT No.: PCT/FI2006/000421
§ 371 (c)(1),
(2), (4) Date: Jun. 3, 2008

(87) PCT Pub. No.: WO2007/074207
PCT Pub. Date: Jul. 5, 2007

(65) Prior Publication Data
US 2008/0271572 A1 Nov. 6, 2008

(30) Foreign Application Priority Data
Dec. 29, 2005 (FI) .................................. 20051334

(51) Int. Cl.
*C22B 58/00* (2006.01)
*C22B 3/44* (2006.01)

(52) U.S. Cl. .................... 75/739; 423/122; 423/140
(58) Field of Classification Search ............... 75/739, 75/743; 423/140, 150.1, 122
See application file for complete search history.

(56) References Cited

U.S. PATENT DOCUMENTS

| 3,976,743 A | 8/1976 | Landucci et al. |
| 6,475,450 B1 | 11/2002 | Saruta et al. |
| 2004/0067183 A1 * | 4/2004 | Fugleberg .................. 423/140 |

FOREIGN PATENT DOCUMENTS

| WO | 0246481 | 6/2002 |
| WO | WO 03/056042 A1 * | 7/2003 |
| WO | 2004076698 | 9/2004 |

* cited by examiner

Primary Examiner—George Wyszomierski
Assistant Examiner—Tima M McGuthry-Banks
(74) Attorney, Agent, or Firm—Chernoff, Vilhauer, McClung & Stenzel

(57) ABSTRACT

Sulphidic zinc concentrate usually also includes small amounts of rare metals such as indium and gallium. If the content of these metals in the raw material is sufficiently high, their recovery may be economically worthwhile. In the method according to the invention the recovery of indium and other desirable rare metals takes place in a zinc leaching process, in which at least part of the sulphidic concentrate is leached directly without roasting.

24 Claims, 1 Drawing Sheet

METHOD FOR RECOVERING RARE METALS IN ZINC LEACHING PROCESS

FIELD OF THE INVENTION

Figure 1:
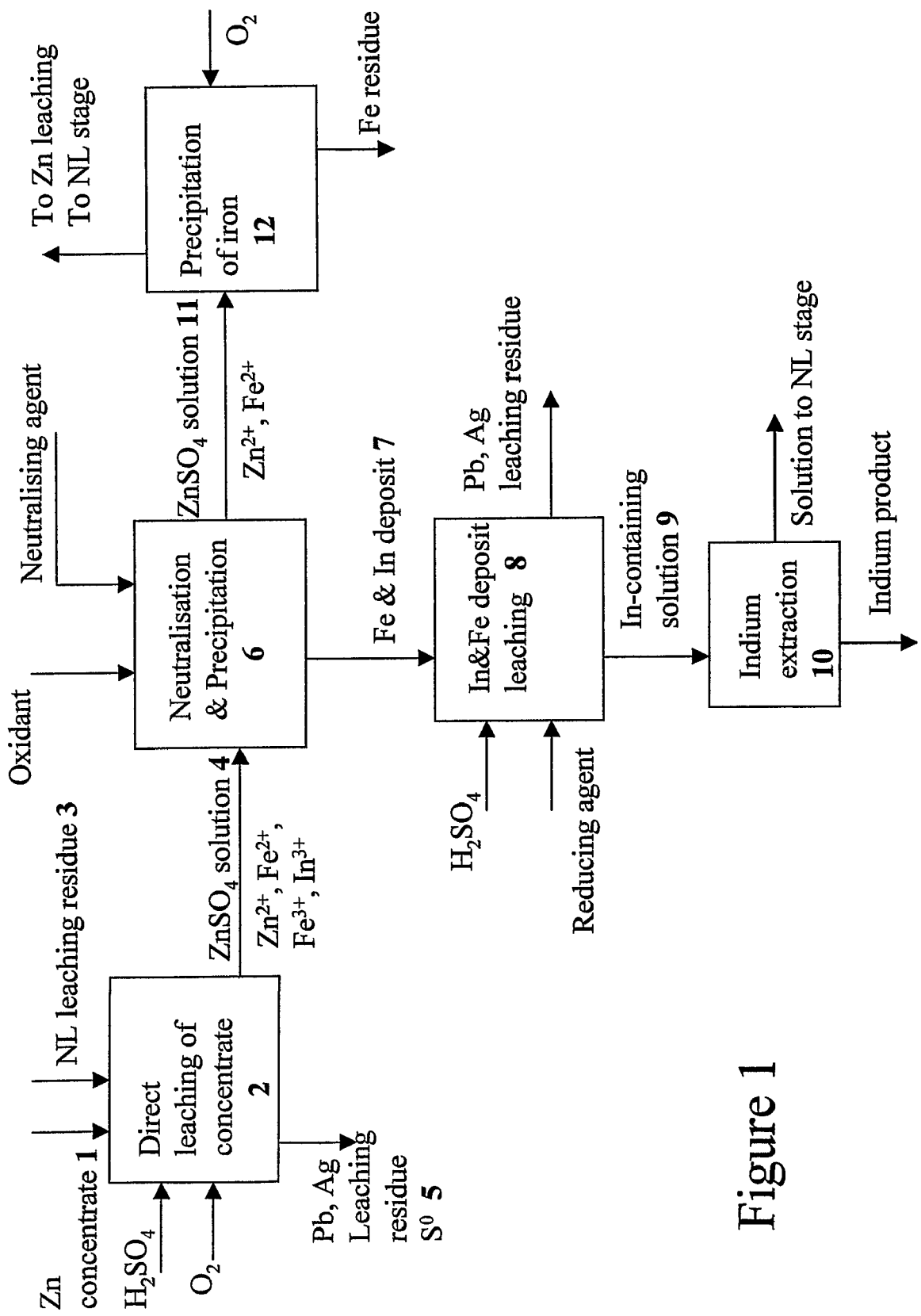

Sulphidic zinc concentrate usually also includes small amounts of rare metals such as indium and gallium. If the content of these metals in the raw material is sufficiently high, their recovery may be economically worthwhile. In the method according to the invention the recovery of indium and other desirable rare metals takes place in a zinc leaching process, in which at least part of the sulphidic concentrate is leached directly without roasting.

BACKGROUND OF THE INVENTION

The conventional method for treating a sulphidic zinc concentrate is concentrate roasting, in which the sulphidic concentrate is roasted into zinc oxide and the iron in the concentrate forms chiefly zinc ferrite. Zinc oxide dissolves fairly easily, so that in the first stage the calcine is subjected to leaching, which is called neutral leaching. Zinc ferrite remains undissolved in neutral leaching and in order to recover this zinc from the ferrite a strong acid leaching is often used. Zinc ferrite residue also contains the ferric iron residue precipitated in neutral leaching. Ferric iron residue for its part contains in addition to ferric hydroxide co-precipitated aluminium hydroxide and rare metals, such as gallium and indium. The ferrite residue can also be fed into a Waelz kiln, in which the zinc is evaporated, and is then oxidised into zinc oxide and fed back into the leaching process. Waelz oxide can also be treated in a separate process step for the sake of recovering the other co-precipitated metals such as indium.

Nowadays the trend is more and more towards processes, in which at least part of the sulphidic zinc concentrate is fed into leaching without roasting. This enables the treatment of impure and fine-grained concentrates. A direct leaching process for zinc sulphide concentrate can be carried out in both atmospheric and pressure leaching processes. However, zinc sulphide leaching requires a far higher acid concentration than that used in the neutral leaching of a calcine, but because the fabrication of elemental zinc nearly always occurs electrolytically, the spent acid from electrolysis can be used in concentrate leaching. Zinc ferrite leaching requires the highest acid concentration of all. Sulphide concentrate leaching can be combined with a process in which the leaching of ferrites formed in roasting occurs as a strong acid leach and thus the leaching of ferrites is performed in connection with concentrate leaching. In that case a counter-current leaching process is used, where in addition to a strong acid leaching stage enabling zinc ferrite leaching there is also a weak acid leaching stage. A significant portion of concentrate leaching occurs for its part even in the weak acid leaching stage. These types of methods are described for instance in U.S. Pat. Nos. 6,475,450, 5,858,315 and 6,340,450 and in WO publication 2004/076698.

Zinc concentrate may contain rare metals such as indium and gallium, which it is desirable to recover. One possible method to implement the recovery of these metals is the processing of neutral leaching leachate in a Waelz kiln into Waelz oxide and the leaching of this oxide, whereupon the metals ending up in the oxide are made to return to the solution and are further recovered in liquid-liquid extraction. This kind of indium and gallium recovery in connection with a Waelz oxide leaching process is known in the prior art. This process is assisted by the fact that these metals have already enriched the Waelz oxide, because they are co-precipitated with ferric hydroxide in neutral leaching. In accordance with the method the zinc oxide that contains a valuable metal is leached by means of sulphuric acid, whereupon the metals and the zinc dissolve and the lead and silver plus other inert compounds in the oxide remain in the residue. The solution is routed to indium extraction, where indium is separated from the zinc, and the zinc sulphate solution is routed to the neutral leaching step. If the concentrate contains gallium, its recovery takes place in principle during indium recovery, whereupon indium and gallium are separated into their own phases.

PURPOSE OF THE INVENTION

When direct concentrate leaching without roasting is linked at least partially to zinc recovery from sulphide concentrate there is no method currently by which indium and other desired rare metals are recovered from concentrate entering direct leaching and the resulting solution. The biggest problem with the recovery of these metals is the solution exiting direct leaching that contains rare metals is in practice unsuitable in composition for the conventional recovery processes of these metals.

The method according to the invention enables the recovery of at least one of the rare metals contained in the concentrate, such as indium and gallium, in connection with the direct leaching of zinc sulphide concentrate.

SUMMARY OF THE INVENTION

The essential features of the invention will be made apparent in the attached claims.

The invention relates to a method of recovering at least one rare metal, such as indium and/or gallium in connection with the leaching of zinc sulphide concentrate. The zinc sulphate solution generated in concentrate leaching, which contains iron and rare metals, is routed to a neutralization and precipitation stage, where the solution is neutralized to a pH area of 2.5-3.5 to precipitate the trivalent iron in the solution and to co-precipitate at least one rare metal with the iron.

The amount of trivalent iron in the zinc sulphate solution is regulated to be 5-10% of the amount of iron in solution, corresponding to the amount needed to precipitate at least one rare metal of those to be co-precipitated from the solution.

If required the zinc sulphate solution is oxidized in the neutralization and precipitation stage to form a sufficient amount of trivalent iron. The solution neutralization is carried out with at least one or more neutralizing agents from the following group: Waelz oxide, calcine, sodium hydroxide, calcium hydroxide, calcium oxide and ammonia.

The precipitate of iron and at least one rare metal that is formed is routed to the leaching stage to leach the rare metal and on to recovery by means of extraction. As the ferric iron content of the solution is too high for the extraction step, it is preferable to reduce some of the ferric iron back to divalent with some suitable substance acting as reducing agent, which is at least one of the group: zinc sulphide concentrate, hydrogen sulphide and sodium sulphide.

LIST OF DRAWINGS

The method according to the invention is depicted in the attached flow sheet 1.

DETAILED DESCRIPTION OF THE INVENTION

The invention relates to a method for the recovery of at least one rare metal in connection with zinc sulphide concentrate leaching. The most common rare metal in zinc sulphide concentrate is indium. Gallium behaves in leaching largely in the same way as indium and so if it is in the concentrate, it can also be recovered if desired at the same time. The third possible rare metal in a zinc raw material is germanium, but it behaves partly in a different way than gallium and indium in the zinc process due to its higher oxidation degree and requires its own kind of process.

As the invention is depicted in the attached flow sheet 1, only indium out of the rare metals is marked for the sake of simplicity, but the method also relates to other rare metals such as gallium. The zinc sulphide concentrate 1 leaching step 2 generally takes place in an acid concentration of 10-50 g/l of sulphuric acid. The sulphuric acid solution is generally the spent acid from electrolysis concentrated if necessary with sulphuric acid. In addition, oxygen-containing gas is fed into the solution such as air, oxygen-enriched air or oxygen. When part of the concentrate is roasted, the ferrite-containing leach residue 3 that remained undissolved in the calcine neutral leaching stage can also be fed into the concentrate leaching step, if there is no separate acid leaching stage for the neutral leach leaching residue in the zinc process. Another alternative is that the ferrite residue is fed into a Waelz kiln. These familiar stages, in which part of the concentrate is roasted and routed subsequently to a neutral leaching step, are not presented in detail in the diagram.

The sulphide concentrate leaching stage 2 generally consists of several reactors and where what is termed a concurrent leaching process is concerned, it is preferable to regulate it so that the acid concentration is highest in the first reactor and decreases in the following reactors. If the leaching residue from the neutral leach is also fed into the direct leaching process, it is more advantageous to use a counter-current leaching process, which includes weak acid and strong acid leaching steps.

Concentrate leaching results in a zinc sulphate solution 4 and a sediment of leaching residue precipitate 5, which mainly contains the lead, silver and other precious metals in the concentrate as well as silica compounds, any gypsum that may have precipitated and elemental sulphur. The zinc sulphate solution 4 also includes the dissolved iron and rare metals of the concentrate, such as indium and gallium. Iron is mainly in divalent form, but the leaching conditions are regulated so that 5-10% of the iron is trivalent i.e. in ferric form, so that its amount corresponds to the amount required in the precipitation of at least one rare metal to be precipitated from the solution. The aim is, however, to minimise the amount of ferric iron in solution, because it accompanies the indium and hinders the production of a pure indium product. It is possible to regulate the ferric iron concentration of the solution already at the leaching stage, but if necessary fine-tuning can be done by increasing the ferric iron concentration in the neutralization step with separate oxidants, such as oxygen, manganese dioxide and potassium permanganate.

The solution containing zinc sulphate 4 exiting zinc sulphide concentrate leaching is routed according to the invention to neutralization and precipitation stage 6, in which the trivalent iron contained in the solution is precipitated out, whereupon the desired rare metals are also co-precipitated with the iron. Solution neutralization is performed with some appropriate neutralising agent. If the process includes concentrate roasting, neutralization can be carried out with the calcine. If the process includes ferrite reduction in a Waelz kiln, the use of Waelz oxide for neutralization is especially advantageous, since there are no ferrites in Waelz oxide and therefore no zinc losses are generated. If the process is not connected to concentrate roasting, it is preferable to perform neutralization with some kind of neutralizing agent that dissolves completely. These are for instance sodium hydroxide NaOH or ammonia $NH_3$ and at least part of the neutralization can be done with calcium oxide or calcium hydroxide.

The pH of the solution is raised to the range of 2.5-3.5 by means of neutralization, whereupon trivalent iron is precipitated, as are indium and the other desired rare metals. The pH should be regulated in the neutralization and precipitation stage to the correct range, so that impurities for the indium process, such as iron, are not precipitated too much with it, and likewise for zinc. The purpose is that only iron in trivalent form should be precipitated and the rest of the iron removed in a separate iron precipitation step. If the amount of trivalent iron in the solution is insufficient for the precipitation of indium and the other desired rare metals, the solution can be oxidised to form ferric iron. Suitable oxidants are the familiar oxidants mentioned above, such as oxygen, manganese dioxide and potassium permanganate.

The neutralization and precipitation stage generates a deposit 7, which contains the indium and other rare metals of the concentrate that co-precipitated with the iron. The deposit obtained is treated using the prior art, so that the deposit is leached in leaching step 8 using a solution containing sulphuric acid. The solution may be a sulphuric acid solution or electrolysis spent acid. The solution obtained 9, which includes rare metals, ferric iron and a little zinc, is routed to liquid-liquid extraction 10 to separate the indium and other rare metals from impurities. If the ferric iron content in this solution is too high for the economic operation of the extraction stage, the ferric iron can be reduced back, for example with zinc concentrate or with a suitable reducing agent such as hydrogen sulphide or sodium sulphide. Extraction gives rise to a solution essentially free of zinc, from which the rare metals are recovered using some known method in itself to form an indium product. The leaching residue that precipitates in the leaching step 8 contains some lead and silver. Especially, if the neutralizing agent used in the neutralization and precipitation stage 6 is Waelz oxide, it contains lead, which precipitates from the solution.

The solution of the neutralization and precipitation stage 6 is an iron-containing zinc sulphate solution 11, from which the iron is precipitated in its own precipitation step 12 in some appropriate way, typically as jarosite, goethite or hematite, and the zinc sulphate solution obtained is routed to the neutral leaching stage. The sulphate solution exiting indium extraction, which contains zinc, is routed via neutral leaching and solution purification to the electrolytic recovery of zinc, because the iron content in it is so small that it does not need to be fed via the iron removal step.

The invention is described further by means of the example below:

EXAMPLE 1

The indium recovery tests were divided into two stages: the precipitation of indium from the zinc sulphate solution produced in zinc concentrate leaching tests and the leaching of the precipitated deposit. The purpose of the leaching stage is to produce a good solution for the further recovery of indium using liquid-liquid extraction. The execution of the method will become apparent from the appended examples.

Indium Precipitation:

1 liter of zinc sulphate solution containing indium was heated to a temperature of 75° C. agitated reactor made of glass. The mixing rate in the reactor was regulated so that the solids were kept in motion throughout the test. The pH of the solution at the beginning of the test was about 1.3 and the ferric iron concentration 2.3 g/l. After this the pH was raised to a value of 3.0 by adding Waelz oxide (addition of 25.01 g), whereupon indium and some impurities (Al, Fe, Zn) began to precipitate. The test was continued for 6 h keeping the pH constant with small additions of Waelz oxide (a total addition throughout the whole test of 26.30 g) and samples of the slurry were taken after 0.5 h, 1 h, 2 h, 3 h, 4 h and 6 h.

The samples were filtered and the indium content of the solution was analysed. These results and the initial composition of the solution are presented below in Table 1.

TABLE 1

Initial composition of the test solution and the indium concentrations at different times of the precipitation test.

| Time [h] | In [mg/l] | Al [mg/l] | Fe [mg/l] | Zn [mg/l] |
|---|---|---|---|---|
| 0 | 83 | 543 | 36300 | 112000 |
| 0.5 | 14 | | | |
| 1 | 13 | | | |
| 2 | 9 | | | |
| 3 | 10 | | | |
| 4 | 8 | | | |
| 6 | 9 | | | |

The results show that indium precipitates effectively and quickly even in the first moments of the test. At the end of the test the total weight of the deposit was 17.72 g. 0.47 g of deposit was removed with the samples during the test.

At the start of the test there was 83 mg of indium in the solution and about 5 mg at the end of the test, in other words the precipitation percentage was about 93%, taking into account the indium removed with the samples.

Leaching of the Indium-Containing Deposit:

The deposit precipitated in the previous stage was leached with a sulphuric acid solution with the purpose of producing a concentrated indium solution for the recovery of indium by means of liquid-liquid extraction. In the residue leaching test, 16.76 g of indium-containing deposit (In concentration 0.67%) from the previous precipitation stage was mixed into a dilute solution of sulphuric acid (0.5 l solution, of which the pH was 1.0 and the temperature 95° C.) in an agitated reactor.

The mixing rate in the glass agitated reactor was adjusted so that the solids remained in motion throughout the entire test. The test was continued for 8 h raising the acid concentration to a value of about 38 g/l at the 2 h point and then keeping it constant for the following 3 hours. The sulphuric acid concentration of the slurry was raised again to a value of 50 g/l at the 5 h point and kept constant for the next 3 h. Samples of the slurry were taken after 1 h, 2 h, 5 h and 8 h.

The samples were filtered and the solution was analysed for indium content and that of the major impurities. These results and the composition of the solution at different times are presented below in Table 2. After leaching the mass of the final residue was 10.63 g and the In concentration 0.13%. On the basis of the deposit analyses and their masses, the leaching yield of indium was about 88%. In this case the indium yield percentage of the whole indium recovery process comes to around 82%.

TABLE 2

Composition and indium concentrations of the test solution at different points in the leaching test.

| Time [h] | In [mg/l] | Al [mg/l] | Fe [mg/l] | Zn [mg/l] |
|---|---|---|---|---|
| 0 | 0 | 0 | 0 | 0 |
| 1 | 69 | 81 | 1870 | 1240 |
| 2 | 70 | 81 | 1930 | 1270 |
| 5 | 79 | 88 | 2140 | 1420 |
| 8 | 92 | 103 | 2600 | 1670 |

The results show that a large part of the indium dissolves during the first two hours, when the pH of the solution is 1. Raising the acid content further improves indium recovery even more. It also shows that the solution is concentrated considerably with regard to indium, when we compare the concentrations of Al, Fe, and Zn to the indium concentrations in the initial solution of the precipitation test and in the final solution of the leaching test.

The invention claimed is:

1. A method for recovering at least one rare metal selected from the group consisting of indium and gallium from a zinc sulphate solution containing iron and rare metals, comprising regulating the amount of trivalent iron in the zinc sulphate solution to be 5-10% of the amount of iron in the solution, and neutralizing the zinc sulphate solution to a pH in the range 2.5-3.5 to precipitate trivalent iron in the solution and to co-precipitate at least one rare metal with the trivalent iron.

2. A method according to claim 1, wherein the step of regulating the amount of trivalent iron in the zinc sulphate solution comprises oxidizing the zinc sulphate solution to form a sufficient amount of trivalent iron.

3. A method according to claim 2, wherein the step of oxidizing the zinc sulphate solution comprises adding an oxidant to the zinc sulphate solution.

4. A method according to claim 1, comprising neutralizing the zinc sulphate solution with at least one neutralizing agent selected from the group consisting of Waelz oxide, calcine, sodium hydroxide, calcium hydroxide, calcium oxide and ammonia.

5. A method according to claim 1, wherein the rare metal is indium.

6. A method according to claim 1, comprising separating the precipitate formed of trivalent iron and at least one rare metal from the neutralized solution and leaching the precipitate with a solution containing sulphuric acid, whereby the rare metal is leached.

7. A method according to claim 6, comprising providing a reducing agent to the step of leaching the precipitate, whereby trivalent iron is reduced to divalent iron, wherein the reducing agent comprises at least one of zinc sulphide concentrate, hydrogen sulphide and sodium sulphide.

8. A method according to claim 6, comprising extracting the rare metal from the solution obtained from the step of leaching the precipitate.

9. A method according to claim 1, further comprising separating the neutralized zinc sulphate solution from the precipitate of trivalent iron and at least one rare metal and precipitating iron from the neutralized zinc sulphate solution from which the precipitate of trivalent iron and at least one rare metal has been separated.

10. A method of processing a zinc sulphide concentrate containing iron and at least one rare metal selected from the group consisting of indium and gallium, comprising:

leaching the zinc sulphide concentrate with sulphuric acid to form a zinc sulphate solution containing iron and at least one rare metal, regulating the amount of trivalent iron in the zinc sulphate solution to be 5-10% of the amount of iron in the solution, and neutralizing the zinc sulphate solution to a pH in the range 2.5-3.5 to precipitate trivalent iron in the solution and to co-precipitate at least one rare metal with the trivalent iron.

11. A method according to claim 10, wherein the leaching step forms said zinc sulphate solution and a leaching residue, the method comprises separating the zinc sulphate solution from the leaching residue, and the step of regulating the amount of trivalent iron in the zinc sulphate solution comprises regulating the amount of trivalent iron in the zinc sulphate solution separated from the leaching residue.

12. A method according to claim 11, wherein the step of regulating the amount of trivalent iron in the zinc sulphate solution separated from the leaching residue comprises oxidizing divalent iron in the separated zinc sulphate solution to form a sufficient amount of trivalent iron.

13. A method according to claim 12, wherein the step of oxidizing divalent iron in the separated zinc sulphate solution comprises adding an oxidant to the separated zinc sulphate solution.

14. A method according to claim 10, wherein the leaching step forms said zinc sulphate solution and a leaching residue, the method comprises separating the zinc sulphate solution from the leaching residue, and the step of neutralizing the zinc sulphate solution comprises adding at least one neutralizing agent selected from the group consisting of Waelz oxide, calcine, sodium hydroxide, calcium hydroxide, calcium oxide and ammonia to the zinc sulphate solution separated from the leaching residue.

15. A method according to claim 10, wherein the rare metal is indium.

16. A method according to claim 10, comprising separating the precipitate formed of trivalent iron and at least one rare metal from the neutralized solution and leaching the precipitate with a solution containing sulphuric acid, whereby the rare metal is leached.

17. A method according to claim 16, comprising providing a reducing agent to the step of leaching the precipitate, whereby trivalent iron is reduced to divalent iron, wherein the reducing agent comprises at least one of zinc sulphide concentrate, hydrogen sulphide and sodium sulphide.

18. A method according to claim 16, comprising extracting the rare metal from the solution obtained from the step of leaching the precipitate.

19. A method according to claim 10, wherein the leaching step forms said zinc sulphate solution and a leaching residue, the method comprises separating the zinc sulphate solution from the leaching residue, and the step of regulating the amount of trivalent iron in the zinc sulphate solution comprises regulating the amount of trivalent iron in the zinc sulphate solution before separating the zinc sulphate solution from the leaching residue and subsequently adjusting the amount of trivalent iron in the zinc sulphate solution separated from the leaching residue.

20. A method according to claim 10, further comprising separating the neutralized zinc sulphate solution from the precipitate of trivalent iron and at least one rare metal and precipitating iron from the neutralized zinc sulphate solution from which the precipitate of trivalent iron and at least one rare metal has been separated.

21. A method of processing a zinc sulphide concentrate containing iron and at least one rare metal selected from the group consisting of indium and gallium, comprising:

roasting a first portion of the zinc sulphide concentrate to form a calcine, and leaching the calcine with a neutral leachant to form a ferrite-containing leach residue leaching a second portion of the zinc sulphide concentrate with sulphuric acid to form a zinc sulphate solution containing iron and at least one rare metal, regulating the amount of trivalent iron in the zinc sulphate solution to be 5-10% of the amount of iron in the solution, neutralizing the zinc sulphate solution to a pH in the range 2.5-3.5 to precipitate trivalent iron in the solution and to co-precipitate at least one rare metal with the trivalent iron, separating the precipitate formed of trivalent iron and at least one rare metal from the neutralized solution and leaching the precipitate with a solution containing sulphuric acid, whereby the rare metal is leached, extracting the rare metal from the solution obtained from the step of leaching the precipitate, and employing the solution remaining after extracting the rare metal for leaching the calcine.

22. A method according to claim 21, further comprising leaching the ferrite-containing leach residue with sulphuric acid together with the second portion of the zinc sulphide concentrate.

23. A method according to claim 21, comprising precipitating iron from the neutralized solution and employing the solution remaining after precipitation of iron for leaching the calcine.

24. A method according to claim 21, further comprising precipitating iron from the neutralized zinc sulphate solution from which the precipitate of trivalent iron and at least one rare metal has been separated and supplying the neutralized zinc sulphate solution from which iron has been precipitated as neutral leachant to the step of leaching the calcine.

* * * * *